United States Patent [19]

Reichelt

[11] Patent Number: 5,247,573
[45] Date of Patent: Sep. 21, 1993

[54] TELECOMMUNICATIONS SYSTEM COMPRISING A CIRCUIT ARRANGEMENT FOR AT LEAST ONE SUBSCRIBER STATION

[75] Inventor: Ingo Reichelt, Schwabach, Fed. Rep. of Germany

[73] Assignee: U.S. Philips Corporation, New York, N.Y.

[21] Appl. No.: 714,294

[22] Filed: Jun. 12, 1991

[30] Foreign Application Priority Data

Jun. 18, 1990 [DE] Fed. Rep. of Germany ....... 4019365

[51] Int. Cl.⁵ .......................... H04M 1/00; H04M 3/00
[52] U.S. Cl. ..................................... 379/399; 379/382; 379/413; 379/418
[58] Field of Search ............... 379/399, 382, 413, 412, 379/418, 377, 387, 252, 255

[56] References Cited

U.S. PATENT DOCUMENTS

| | | | |
|---|---|---|---|
| 4,063,045 | 12/1977 | Greischar | 379/387 |
| 4,243,842 | 1/1981 | Gibb | 379/399 |
| 4,376,876 | 3/1983 | Versteeg et al. | 379/413 |
| 4,685,130 | 8/1987 | Burns | 379/399 |
| 4,691,344 | 9/1987 | Brown et al. | 379/413 |

OTHER PUBLICATIONS

"Telecommunications Protection Circuits, Protection Design Guide" Texas Instruments, 1986, DL 32-11/86, S/C Rev. 6.

*Primary Examiner*—James L. Dwyer
*Assistant Examiner*—Jack Chiang
*Attorney, Agent, or Firm*—Leroy Eason

[57] ABSTRACT

A subscriber line control circuit for controlling a reversing switch to couple a subscriber station either to an AC signalling voltage generator or to a DC line voltage supply, depending on whether the subscriber station is on-hook or off-hook. The control circuit includes a capacitor connected between the subscriber line and the reversing switch and which by means of a rectifier is charged to a DC charge voltage by alternate half cycles of the AC signalling voltage. During the other half cycles the DC charge voltage superimposes on the AC signalling voltage and so is available for actuating an automatic switching arrangement by which the subscriber station is selected for coupling to the reversing switch. When the subscriber station goes off-hook the capacitor discharges over the subscriber line, resulting in a change in voltage or current which is detected by a detection circuit. The detection circuit then supplies a control signal to the reversing switch to cause it to change-over to the DC line voltage supply. Such control circuit thereby dispenses with the need for an auxiliary DC source for actuating the automatic switching arrangement.

11 Claims, 3 Drawing Sheets

TELECOMMUNICATIONS SYSTEM COMPRISING A CIRCUIT ARRANGEMENT FOR AT LEAST ONE SUBSCRIBER STATION

BACKGROUND OF THE INVENTION

1. Field of the Invention

The invention relates to a telecommunications system comprising at least one subscriber station and a circuit arrangement connecting a subscriber station by means of a reversing switch either to an AC signalling voltage generator or a line voltage supply.

2. Description of the Related Art

A telecommunications system of this type is known in the art for use, for example, as telephone exchange. The publication entitled "Telecommunications Protection Circuits, Protection Design Guide" Texas Instruments, 1986, DL 32-11/86, S/C Rev. 6, discusses several circuit arrangements in which either an AC voltage generator or a subscriber station DC line voltage supply circuit can be connected to at least one subscriber station by means of a reversing switch. While the AC voltage generator is so connected a further DC voltage generator (battery) delivers a DC voltage superimposed on the AC voltage to the subscriber station. When there is a call, the reversing switch connects the line voltage supply circuit to the subscriber station so as to deliver, for example, a DC operating voltage.

Generally, a plurality of subscribers' stations are connected to the reversing switch by means of an automatic change-over switch (AWADO). Such an automatic change-over switch needs a DC voltage to operate faultlessly. For that purpose, a DC voltage is superimposed on the AC voltage. In order to minimize the circuitry, coilless AC signalling voltage generators without a DC voltage generator are preferable. In that case, however, the automatic change-over switch cannot operate faultlessly.

SUMMARY OF THE INVENTION

Therefore, it is an object of the invention to provide a telecommunications system comprising a circuit arrangement for a subscriber station, in which a DC voltage is derive without the use of a DC voltage generator.

A first solution to this objective in a telecommunications system comprising a circuit arrangement of the type mentioned in the preamble is characterized in that a capacitor is inserted between the subscriber station and the reversing switch, and there is provided a branch comprising a first rectifier arrangement for passing a half wave of the AC current produced by the AC signalling voltage generator. In parallel with the first capacitor and the reversing switch there is provided a second rectifier arrangement for passing a DC current produced by the subscriber station line voltage supply circuit. In parallel with the first capacitor is a detection circuit for controlling the reversing switch by detecting the current at the first capacitor, or by detecting at the first rectifier arrangement or the voltage at the first capacitor.

While the AC signalling voltage generator is coupled to the subscriber station by means of the reversing switch and an automatic change-over switch, the receiver of the subscriber station is on the hook and the subscriber station does not receive DC operating current. When the receiver goes off the hook, the reversing switch is connected to the DC line voltage supply circuit and the subscriber station receives DC operating current.

In the circuit arrangement according to the invention and when implementing the first solution, the first rectifier arrangement is used for rectifying the AC voltage. That is, when the first rectifier arrangement is in the conductive state it passes only a half wave of the AC voltage produced by the AC voltage generator. Consequently, the first capacitor is charged to the peak value of the AC voltage of the AC signalling voltage generator. The voltage to which the first capacitor is thereby charged is superimposed on the AC voltage. As a result of this DC voltage portion, an operational disturbance is avoided when an automatic change-over switch is used.

The second rectifier arrangement which passes the DC current supplied by the line voltage supply circuits, is provided so that such DC current can reach the subscriber station after the reversal of the change-over switch. The second rectifier arrangement thus provides a bypassing of the first capacitor.

Furthermore, in this circuit arrangement the low-frequency insertion loss is negligibly small and it also has little DC power dissipation.

A second solution to the aforesaid objective in a telecommunications system comprising a circuit arrangement of the type mentioned in the preamble is therefore characterized in that a first capacitor is inserted between the subscriber station and a terminal of the reversing switch and a series connection of two rectifier arrangements is connected in parallel to the first capacitor. A second capacitor is inserted between the other terminal of the reversing switch and the line between the two rectifier arrangements. One of the rectifier arrangements passes a half wave of the AC current produced by the AC signalling voltage generator, the second rectifier arrangement being for passing the other half wave. Both rectifier arrangements pass the DC current produced by the subscriber station line voltage supply circuit. A first detection circuit may be provided for controlling the reversing switch by detection of the current or the voltage at the first capacitor or in that a second detection circuit is provided for controlling the reversing switch by detection of the voltage at the second capacitor.

In such second solution the first rectifier arrangement passes the AC voltage produced by the AC signalling voltage generator during a first half wave, so that the second capacitor is charged to a value which is equal to the peak of the AC voltage of the AC signalling voltage generator. Consequently, during the second half wave the first capacitor becomes charged to twice the peak value of the AC voltage of the AC signalling voltage generator, because the second rectifier arrangement is conductive. The polarity of the values to which the first and second capacitors are charged depends on the direction in which the two rectifier arrangements pass the AC voltages. The voltage to which the first capacitor is charged is superimposed on the AC voltage.

In order that the DC signalling voltage produced by the subscriber station line voltage supply circuit can reach the subscriber station also after the reversal, the two rectifier arrangements bypass the first capacitor.

With this circuit arrangement the low-frequency insertion loss is negligibly small too and it likewise has little DC power dissipation.

When the subscriber lifts the receiver off hook the first capacitor discharges. The resulting change of voltage or change of current may be used for controlling the reversing switch. Consequently, with either one of the two solutions a detection circuit is provided.

According to the first solution, for generating a negative DC voltage which equals the negative peak value of the AC voltage of the AC signalling voltage generator, the first rectifier arrangement comprises a first diode and the second rectifier arrangement comprises a second diode, the cathode of the second diode and a lead of the first capacitor being connected to a terminal of the reversing switch, and the other lead of the capacitor and the anodes of the two diodes being connected. When a negative half wave of the AC voltage is applied to the cathode of the first diode, this diode is switched to forward conduction and the first capacitor is charged to the negative peak value of the AC voltage. When the positive half wave of the AC voltage is available, the first diode is blocked. While the subscriber station and the subscriber station line voltage supply circuit are coupled by means of the reversing switch, the cathode of the second diode is connected to the negative line of the subscriber station line voltage supply circuit. The second diode is thus conductive and bypasses the first capacitor.

According to the first solution, for generating a positive DC voltage which is equal to the positive peak value of the AC voltage of the AC signalling voltage generator, the first rectifier arrangement comprises a first diode and the second rectifier arrangement comprises a second diode, the anode of the second diode and a lead of the first capacitor being connected to a terminal of the reversing switch, the other lead of the capacitor and the cathodes of the two diodes being connected. When a positive half wave of the AC voltage is applied to the anode of the first diode, the latter is switched to forward conduction and the first capacitor is recharged to the positive peak value of the AC voltage. When the negative half wave of the AC voltage is applied, the first diode is blocked. When the subscriber station and the line voltage supply circuit are coupled, the first capacitor is bypassed by the second diode.

According to the second solution, for generating a negative DC voltage which is equal to twice the negative peak value of the AC voltage of the AC signalling voltage generator, the first rectifier arrangement comprises a first diode and the second rectifier arrangement comprises a second diode, the cathode of the second diode and a lead of the first capacitor being connected to a terminal of the reversing switch. The anode of the first diode is connected to the other lead of the first capacitor, and the cathode of the first diode and the anode of the second diode are connected to a second capacitor whose other lead is connected to a line of the subscriber station and the other terminal of the reversing switch. When the negative half wave of the AC voltage occurs, the second diode is conductive and the second capacitor is charged to the negative peak value of the AC voltage of the AC signalling voltage generator. When the positive half wave occurs, the first diode is conductive and the first capacitor is charged to twice the negative peak value. While the line voltage supply station and the subscriber circuit are coupled by means of the reversing switch, the cathode of the second diode is connected to the negative line of such supply circuit. The first and second diodes are conductive and bypass the first capacitor. In this embodiment the two diodes have a twofold function. On the one hand, they are used for rectifying and, on the other hand, for bypassing the first capacitor.

According to the second solution, for generating a positive DC voltage which is equal to twice the positive peak value of the AC voltage of the AC signalling voltage generator, the first rectifier arrangement comprises a first diode and the second rectifier arrangement comprises a second diode, the anode of the second diode and a lead of the first capacitor being connected to a terminal of the reversing switch. The cathode of the first diode is connected to the other lead of the first capacitor and the anode of the first diode and the cathode of the second diode are connected to a second capacitor whose other lead is connected to a line of the subscriber station and the other terminal of the reversing switch. When a positive half wave of the AC voltage occurs, the second diode is conductive and the second capacitor is charged to the positive peak value of the AC voltage. When the negative half wave of the AC voltage occurs, the first diode is conductive and the first capacitor is charged to twice the positive peak value of the AC voltage. While the subscriber station and the line voltage supply circuit are coupled, the first capacitor is bypassed by the series combination of the first and second conductive diodes. Also, in this case the two diodes perform the twofold function of rectifier and bypass of the first capacitor.

A further feature of the invention is that the detection circuit comprises a comparator for receiving, on the one hand, the voltage at the first or second capacitor and, on the other hand, for receiving a reference voltage and for controlling the reversing switch by means of the output signal.

In a still further aspect of the invention that the detection circuit comprises an optocoupler including a light-emitting diode for receiving the current through the first capacitor or the current through the first rectifier arrangement, and a phototransistor for controlling the reversing switch. A change of current through the first capacitor or through the first rectifier arrangement is detected and used for driving the reversing switch.

BRIEF DESCRIPTION OF THE DRAWINGS

Embodiments of the invention will be further explained with reference to the drawings, in which.

DESCRIPTION OF THE PREFERRED EMBODIMENTS

Figure 1:
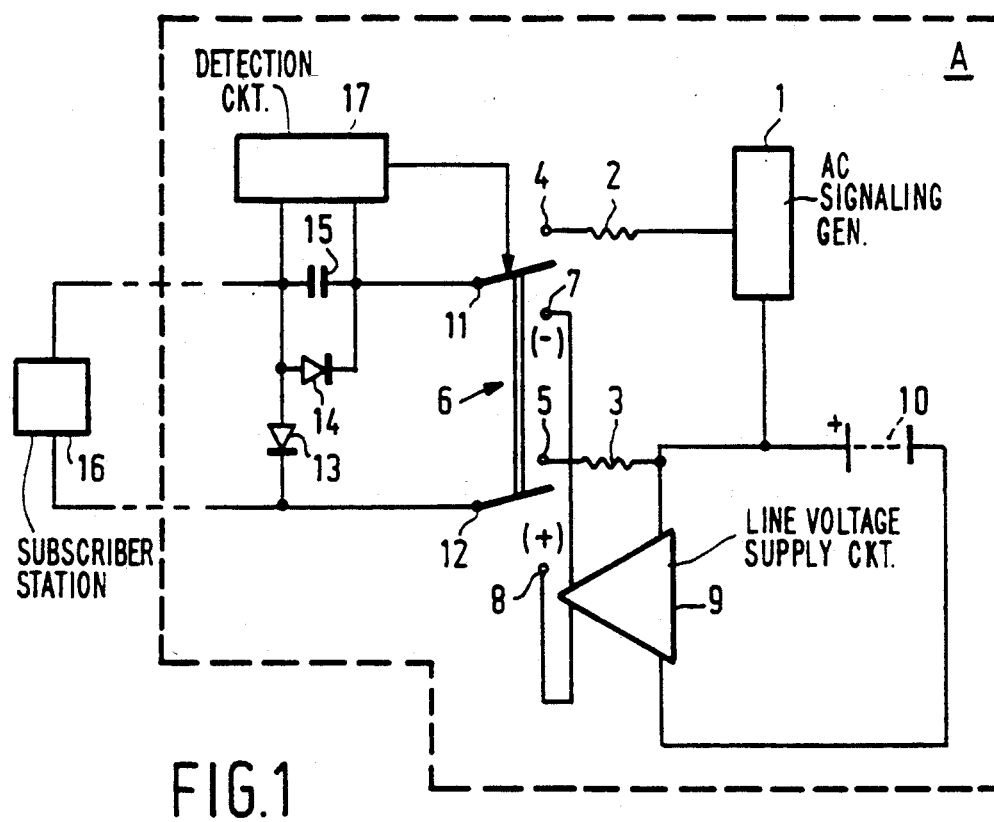
FIGS. 1 to 4 show telecommunications systems comprising circuit arrangements for a subscriber station.

FIG. 1 shows a telecommunications system, for example a telephone exchange A, comprising a circuit arrangement which includes an AC signalling voltage generator 1 which is connected through two resistors 2 and 3 to two terminals 4 and 5 respectively, of a reversing switch 6. The reversing switch 6 has two further terminals 7 and 8 to which a subscriber station line voltage supply circuit 9 is connected, powered in its turn by a battery 10. Two further terminals 11 and 12 of the reversing switch 6 are connected to further circuit elements. On the one hand, the reversing switch can establish a connection between the terminals 11 and 4 and terminals 12 and 5, and on the other hand, between the terminals 11 and 7 and the terminals 12 and 8 respectively.

To the terminal 12 of the reversing switch 6 the cathode of a first diode 13 is connected, whose anode is connected to the anode of a second diode 14 and to a lead of a first capacitor 15. The terminal 11 of the reversing switch 6, the other lead of the first capacitor 15, and the cathode of the second diode 14 form a common node. Between the anode of the second diode 14 and the cathode of the first diode 13 a subscriber station 16 is inserted by means of an automatic change-over switch (not shown except by dashed lines). A detection circuit 17 for controlling the reversing switch 6 is connected to the two leads of the first capacitor.

When there is a call, the AC signalling voltage generator 1 applies via the reversing switch 6 an AC voltage to the subscriber station 16 for energizing a ringing device therein. The subscriber station 16 does not pass DC current when the receiver thereof still is on the hook. When a negative half wave of the AC voltage of the AC signalling voltage generator 1 is applied to the cathode of the first diode 13, the diode 13 is switched to forward direction. The first capacitor 15 then is charged to the negative peak value of the AC voltage. When the positive half wave of the AC voltage of the AC signalling voltage generator 1 is applied to the cathode of the first diode 13, the diode 13 blocks. The DC voltage on the first capacitor is superimposed on the AC voltage.

When the subscriber lifts the receiver, the subscriber station 16 passes DC current. Consequently, the charge of the first capacitor 15 is altered. This charge alteration is detected by the detection circuit 17, which then reverses the reversing switch 6 so that the terminals 11 and 7 and the terminals 12 and 8 respectively, are connected.

The subscriber station line voltage supply circuit 9 delivers a DC operating line voltage to the subscriber station 16 upon reversal of the reversing switch 6. The negative line of the subscriber line voltage supply circuit 9 is connected to the terminal 7 and the positive line to the terminal 8. For the DC current to reach the subscriber station 16 the second diode 14 is provided which bypasses the first capacitor 14 as regards the DC current.

When there is no call, the AC signalling voltage generator is switched off.

Figure 2:
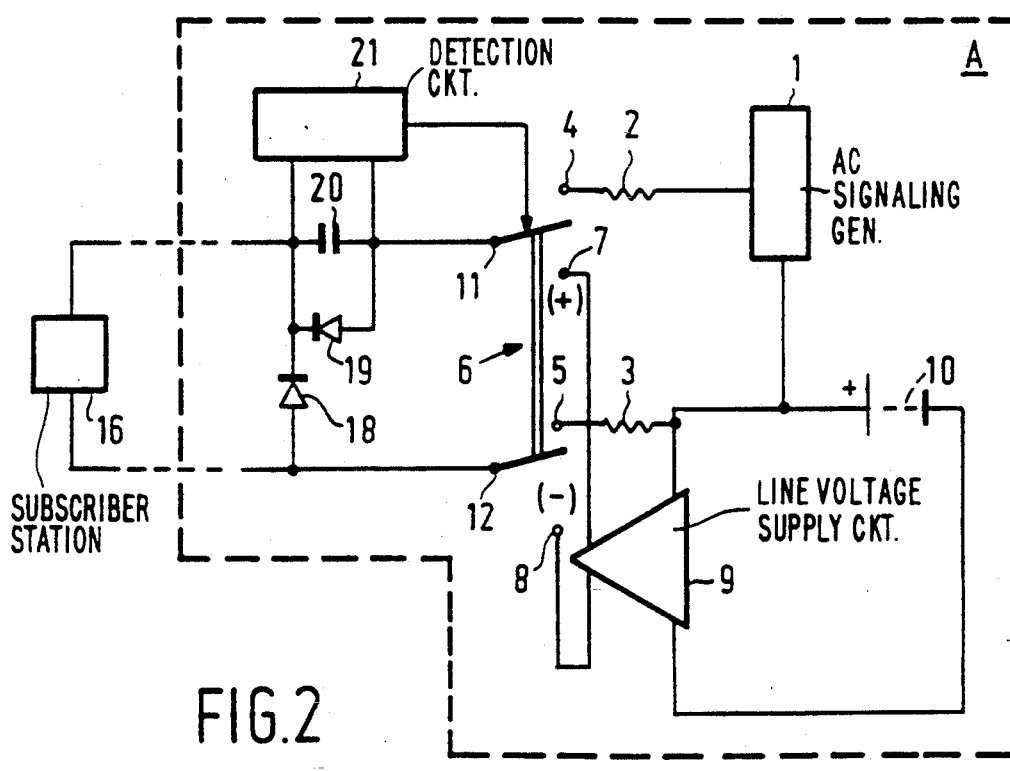

In FIG. 2, representing a further circuit arrangement for generating a DC voltage portion to be superimposed on the AC signalling voltage, the anode of a first diode 18 and a line of the subscriber station 16 are connected to the terminal 12 of the reversing switch 6. The cathode of the first diode 18 is connected to the cathode of a second diode 19, to a lead of a first capacitor 20 and to the other line of the subscriber station 16. The anode of the second diode 19 and the other lead of the first capacitor 20 are connected to the terminal 11 of the reversing switch 6. A detection circuit 21 is furthermore connected to the two leads of the first capacitor 20 and controls the reversing switch 6.

When there is a call, the AC signalling voltage generator 1 is coupled to the subscriber station 16 by means of the reversing switch 6. When a positive half wave of the AC voltage of the AC signalling voltage generator 1 is applied to the anode of the first diode 18, the diode 18 is switched in forward direction and the first capacitor 20 is charged to the positive peak value of the AC voltage. When the negative half wave of the AC voltage of the AC signalling voltage generator 1 is applied to the anode of the first diode 18, the diode 18 is blocked. The DC voltage portion which is generated with the aid of the first capacitor 20 is superimposed on the AC voltage generated by the AC signalling voltage generator 1 and applied to the subscriber station 16. The first detection circuit 21 detects, as does the first detection circuit 17 shown in FIG. 1, the charge alteration of capacitor 20 and controls the reversing switch 6 in response to this alteration. The second diode 19 is provided for bypassing the first capacitor 20. When a subscriber lifts the receiver, the line voltage supply circuit 9 produces a DC operating current to be applied to the subscriber station 16. This DC current reaches the subscriber station 16 through the second diode 19.

Figure 3:
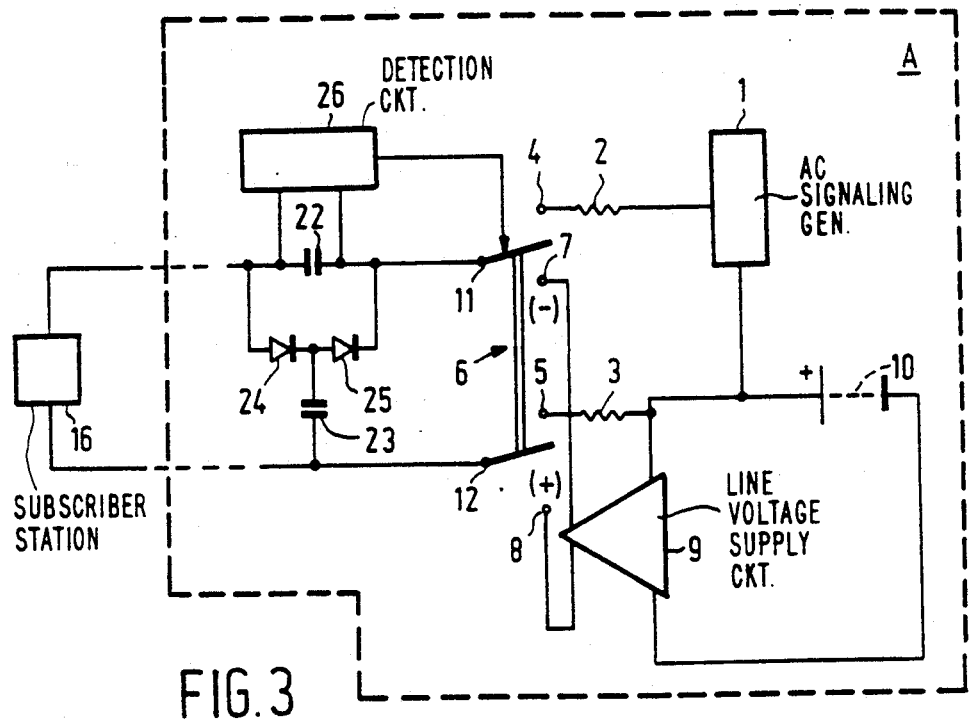

In the circuit arrangement shown in FIG. 3 a DC voltage is generated which is superimposed on the AC voltage produced by the AC signalling voltage generator 1 and which is equal to twice the negative peak value of the AC voltage. For this purpose, a first capacitor 22, a second capacitor 23, a first diode 24 and a second diode 25 are provided. A lead of the first capacitor 22 is connected to the terminal 11 of the reversing switch 6 and to the cathode of the second diode 25. The other lead of the first capacitor 22 is connected to a line of the subscriber station 16 and to the anode of the first diode 24. A lead of the second capacitor 23, the cathode of the first diode 24 and the anode of the second diode 25 form a common node. The other lead of the second capacitor 23 and the other line of the subscriber station 16 are connected to the terminal 12 of the reversing switch 6.

When a negative half wave of the AC voltage occurs, the second diode 25 is conductive, and the second capacitor 23 is charged to the negative peak value of the AC voltage of the AC signalling voltage generator 1. When the positive half wave occurs, the first diode 24 is conductive and the first capacitor 22 is charged to twice the negative peak value of the AC voltage. The DC voltage produced with the aid of the capacitor 22 is superimposed on the AC voltage.

For detecting a charge alteration a first detection circuit 26 is connected to the two leads of the first capacitor 22, which detection circuit controls the reversing switch 6 in response to the voltage on capacitor 22. By means of the two diodes 24 and 25 the first capacitor 22 is bypassed as regards DC current, so that a DC operating voltage can be delivered to the subscriber station 16 by the subscriber station feeding line voltage supply circuit.

Figure 4:
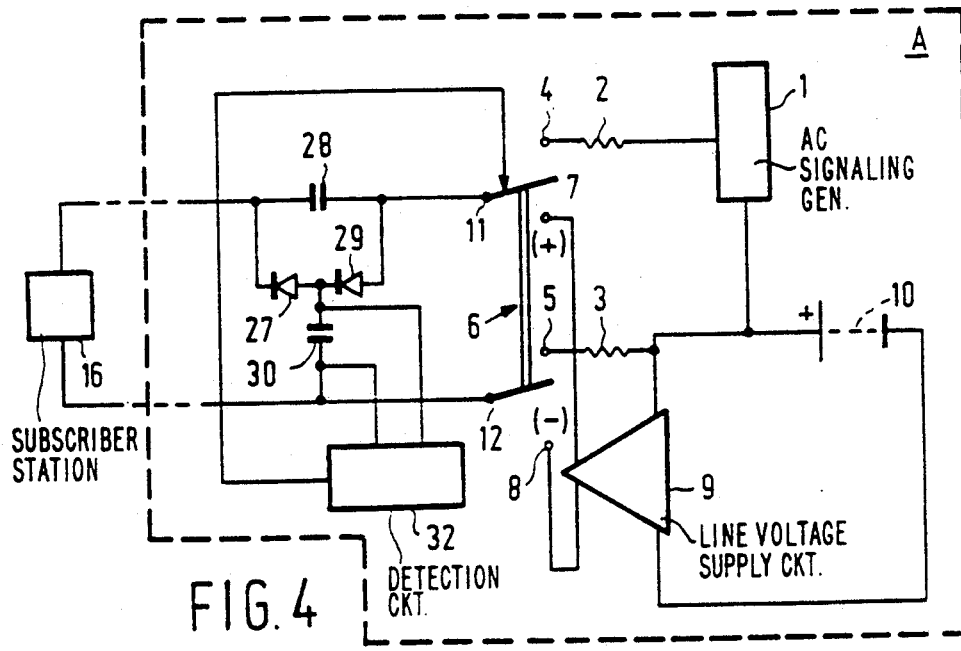

By means of the circuit arrangement as shown in FIG. 4 a positive DC voltage can be generated, whose value corresponds to twice the peak value of the AC voltage. For this purpose, a first diode 27 is provided whose cathode is connected to a line of the subscriber station 16 and to a lead of a first capacitor 28. The anode of the first diode 27 is connected to the cathode of a second diode 29 and a lead of a second capacitor 30. The anode of the second diode 29 and the other lead of the first capacitor 28 are connected to terminal 11 of the reversing switch 6. The other line of the subscriber station 16, the other lead of the second capacitor 30 and the terminal 12 of the reversing switch 6 form a common node. When the AC signalling voltage generator 1 is coupled to the subscriber station 16 by means of the reversing switch 6, the capacitor 28 is charged to twice the positive peak value of the AC voltage. When the subscriber station feeding circuit 9 is coupled to the subscriber station 16, the first capacitor 28 is bypassed as regards DC current by the two diodes 27 and 29.

A second detection circuit 32 provided for controlling the reversing switch is connected to the two leads of the second capacitor 30. When the detection circuit 32 detects a charge variation at the capacitor 30, the reversing switch is energized.

Figure 5:
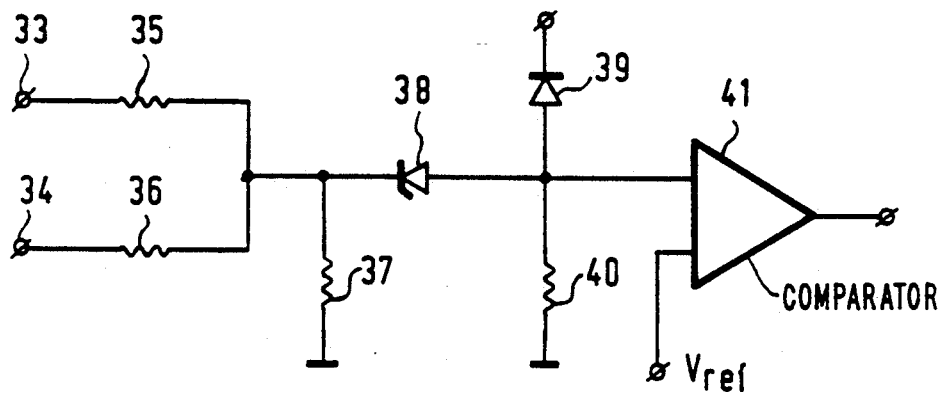
FIGS. 5 and 6 show embodiments of the detection circuits used in the FIGS. 1 to 4.

An embodiment of the detection circuit 17, 21, 26 or 32 is represented in FIG. 5. The two inputs 33 and 34 of the detection circuit as shown in FIG. 5 would be connected to the two leads of the capacitor 15, 20, 22 or 30 in FIGS. 1 to 4. The input 33 is connected to a resistor 35 and the input 34 to a resistor 36. The further lines of the two resistors 35 and 36 are connected to a further resistor 37 which is connected to ground and to a cathode of a Zener diode 38. The anode of the Zener diode 38 is connected to an anode of a further diode 39 and to a resistor 40, whose other side is connected to ground. The cathode of the diode 39 is connected to a voltage supply line. The anode of the Zener diode 38 is also connected to a first input of a comparator 41 whose other input has a reference voltage $V_{ref}$. The output of the comparator 41 produces a reversing signal for the reversing switch 6. It is the task of the Zener diode 38 to provide that at a specific threshold value corresponding to the Zener voltage, the comparator 41 is suddenly supplied with a different voltage. When there is a charge variation in a capacitor connected at inputs 33 and 34, whose voltage drops below the Zener voltage, the comparator 41 produces a reversed signal at its output which signal is applied to the reversing switch 6 in FIGS. 1 to 4.

Figure 6:
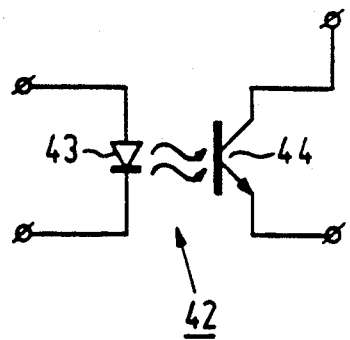

Another embodiment of a detection circuit for detecting the current through a capacitor 15, 20, 22 or 28 in FIGS. 1 to 4, or through the diodes 13 and 14 in FIG. 1 or 18 and 19 in FIG. 2, is shown in FIG. 6. This detection circuit comprises an optocoupler 42 through whose light-emitting diode 43 the current of the capacitor 15, 20, 22 or 28 passes or the current through diode 13 or 18. The light emitted by the light-emitting diode 43 is received by the phototransistor 44 of the optocoupler 42. The collector of this phototransistor 44 is connected to a supply voltage and at its emitter is produced the reversing signal for the reversing switch 6 in FIGS. 1 to 4. When there is a sufficient charge variation, the optocoupler 42 produces a reversal of the reversing signal.

I claim:

1. A subscriber line control circuit for use in a telecommunications system which comprises at least one subscriber station which goes either on-line or off-line, an AC signalling voltage generator, a DC line voltage supply, and a reversing switch for coupling a subscriber station to the signalling voltage generator when the reversing switch is at a first setting and to the line voltage supply when the reversing switch is at a second setting; said control circuit comprising:

a first capacitor coupled between a first output terminal of the reversing switch and a line to the subscriber station;

a first rectifier coupled between the first capacitor and a second output terminal of the reversing switch, said first rectifier passing current produced during alternate half cycles of the AC signalling voltage when the reversing switch is at said first setting and the subscriber station is off-line, said current charging the first capacitor to a DC charge voltage, said charge voltage discharging via the subscriber station when the subscriber station goes on-line;

a second rectifier coupled between the first rectifier and said first output terminal of the reversing switch, said second rectifier passing DC current produced by the line voltage supply when the reversing switch is at said second setting thereof and the subscriber station is on-line; and a detection circuit coupled to at least one of said first capacitor and first and second rectifiers for detecting when the charge voltage of the first capacitor discharges and then producing a control signal for changing the reversing switch to said second setting thereof.

2. A circuit arrangement as claimed in claim 1, wherein the first and second rectifiers are connected in series across the first capacitor, there being a common junction point between said rectifiers, and further comprising a second capacitor coupled between said junction point and said second terminal of the reversing switch; the second capacitor being charged to a charge voltage by current produced during alternate half cycles of the AC signalling voltage so that during succeeding half cycles thereof the charge voltage on the second capacitor augments the AC signalling voltage and thereby augments the voltage to which the first capacitor is charged when the subscriber station is off-line; said detection circuit being coupled to one of said capacitors and being adapted to detect when the charge voltage of said one of said capacitors discharges.

3. A control circuit as claimed in claim 1, wherein the first and second rectifiers are first and second diodes respectively, the cathode of the second diode and a first lead of the first capacitor are together connected to the first output terminal of the reversing switch, and a second lead of the first capacitor and the anodes of the first and second diodes are together connected to said line to the subscriber station.

4. A control circuit as claimed in claim 1, wherein the first and second rectifiers are first and second diodes respectively, the anode of the second diode and a first lead of the first capacitor being together connected to the first output terminal of the reversing switch, and a second lead of the first capacitor and the cathodes of the first and second diodes being together connected to said line to the subscriber station.

5. A circuit arrangement as claimed in claim 1, wherein the first and second rectifiers are first and second diodes respectively, the cathode of the second diode and a first lead of the first capacitor are together connected to the first terminal of the reversing switch, the anode of the first diode and a second lead of the first capacitor are together connected to said line to the subscriber station, the anode of the first diode and the cathode of the second diode are together connected to a first lead of the second capacitor, and a second lead of the second capacitor is connected to the second terminal of the reversing switch and to another line to the subscriber station.

6. A circuit arrangement as claimed in claim 1, wherein the first and second rectifiers are first and second diodes respectively, the anode of the second diode and a first lead of the first capacitor are together connected to the first terminal of the reversing switch, the cathode of the first diode and a second lead of the first capacitor are together connected to said line to the subscriber station, the anode of the first diode and the cathode of the second diode are together connected to a first lead of the second capacitor, and a second lead of the second capacitor is connected to the second terminal of the reversing switch and to a further line to the subscriber station.

7. A circuit arrangement as claimed in claim 1, wherein the detection circuit is connected to the first capacitor to detect the charge voltage thereof and comprises a comparator for comparing said charge voltage with a reference voltage and producing said control signal depending on a result of such comparison.

8. A circuit arrangement as claimed in claim 2, wherein the detection circuit is connected to the first capacitor to detect the charge voltage thereof and comprises a comparator for comparing said charge voltage with a reference voltage and producing said control signal depending on a result of such comparison.

9. A circuit arrangement as claimed in claim 2, wherein the detection circuit is connected to the second capacitor to detect the charge voltage thereof and comprises a comparator for comparing said DC charge voltage with a reference voltage and producing said control signal depending on a result of such comparison.

10. A circuit arrangement as claimed in claim 1, wherein the detection circuit is an optocoupler comprising a light emitting diode and a phototransistor, the light emitting diode being in a path of the current which charges said first capacitor, the phototransistor being responsive to radiation from the light emitting diode to produce said control signal for controlling the setting of the reversing switch.

11. A circuit arrangement as claimed in claim 2, wherein the detection circuit is an optocoupler comprising a light emitting diode and a phototransistor, the light emitting diode being in a path of the current which charges one of the first and second capacitors, the phototransistor being responsive to radiation from the light emitting diode to produce said control signal for controlling the setting of the reversing switch.

* * * * *